United States Patent
Pakarinen

(10) Patent No.: US 11,089,871 B2
(45) Date of Patent: Aug. 17, 2021

(54) FURNITURE PANEL ASSEMBLY COMPRISING A WHEELHOUSE CASSETTE, AND A FURNITURE COMPRISING SUCH FURNITURE PANEL ASSEMBLY

(71) Applicant: IKEA SUPPLY AG, Pratteln (CH)

(72) Inventor: Matias Pakarinen, Limhamn (SE)

(73) Assignee: IKEA Supply AG, Pratteln (CH)

( * ) Notice: Subject to any disclaimer, the term of this patent is extended or adjusted under 35 U.S.C. 154(b) by 0 days.

(21) Appl. No.: 16/464,473

(22) PCT Filed: Nov. 24, 2017

(86) PCT No.: PCT/SE2017/051165
§ 371 (c)(1),
(2) Date: May 28, 2019

(87) PCT Pub. No.: WO2018/101876
PCT Pub. Date: Jun. 7, 2018

(65) Prior Publication Data
US 2019/0374028 A1    Dec. 12, 2019

(30) Foreign Application Priority Data

Nov. 29, 2016  (SE) ........................................ 1651562

(51) Int. Cl.
*A47B 88/41* (2017.01)
*A47B 88/95* (2017.01)
(Continued)

(52) U.S. Cl.
CPC .............. *A47B 88/41* (2017.01); *A47B 88/95* (2017.01); *A47B 91/06* (2013.01); *A47B 96/20* (2013.01);
(Continued)

(58) Field of Classification Search
CPC ......... A47B 88/41; A47B 91/06; A47B 96/20; B60B 33/0026; B60B 3/002;
(Continued)

(56) References Cited

U.S. PATENT DOCUMENTS 637,677 A * 11/1899 Shively ............... E05D 15/0669
16/100
2,273,918 A    2/1942 Zalkland
(Continued)

FOREIGN PATENT DOCUMENTS

CN    202664826 U    1/2013
CN    106901526 A    6/2017
(Continued)

OTHER PUBLICATIONS

International Search Report and Written Opinion for PCT/SE2017/051165, dated Feb. 16, 2018.
(Continued)

*Primary Examiner* — Daniel J Rohrhoff
(74) *Attorney, Agent, or Firm* — Merchant & Gould P.C.

(57) ABSTRACT

The invention refers to a furniture panel assembly (200, 200' 200", 200''') comprising a furniture panel (300, 300' 300", 300''') and a wheelhouse cassette (100, 100', 100", 100'''). The furniture panel (300, 300' 300", 300''') has a slot (23) extending in a plane in parallel with and at least partly between the major surfaces of the furniture panel (300, 300' 300", 300''') and the wheelhouse cassette (100, 100", 100", 100''') is positioned in the slot (23). The wheelhouse cassette (100, 100', 100", 100''') comprises a wheelhouse (1; 1'; 1"; 1''') and a wheel (2) adapted to be inserted into and retainably engage the wheelhouse (1; 1'; 1"; 1''').

14 Claims, 5 Drawing Sheets

(51) Int. Cl.
    *A47B 91/06*     (2006.01)
    *A47B 96/20*     (2006.01)
    *B60B 3/00*     (2006.01)
    *B60B 33/00*     (2006.01)

(52) U.S. Cl.
    CPC ............ *B60B 3/002* (2013.01); *B60B 33/0026* (2013.01); *B60B 33/0063* (2013.01)

(58) Field of Classification Search
    CPC ............. B60B 33/0063; Y10T 16/3819; Y10T 16/384; Y10T 16/387
    See application file for complete search history.

(56) References Cited

U.S. PATENT DOCUMENTS

| | | | | |
|---|---|---|---|---|
| 3,619,947 A | * | 11/1971 | Burum | E05D 15/0669 49/265 |
| 3,698,036 A | * | 10/1972 | Goodman | E05D 15/0665 16/100 |
| 4,095,853 A | * | 6/1978 | MacDonald | A47B 88/41 384/19 |
| 4,102,009 A | * | 7/1978 | Kelly | E05D 15/0669 16/100 |
| 4,861,122 A | * | 8/1989 | Newhouse | A47B 67/04 312/330.1 |
| 6,193,324 B1 | * | 2/2001 | Chang | A45C 5/14 190/18 A |
| 6,253,891 B1 | * | 7/2001 | Miller | A45C 5/14 190/18 A |
| 6,315,368 B1 | * | 11/2001 | Kuo | A45C 5/14 190/18 A |
| 2010/0229340 A1 | * | 9/2010 | Cheng | B60B 33/0005 16/45 |
| 2013/0134850 A1 | * | 5/2013 | Berkowitz | A47B 88/487 312/317.1 |
| 2019/0329589 A1 | * | 10/2019 | Walden | A01D 34/64 |

FOREIGN PATENT DOCUMENTS

| | | |
|---|---|---|
| EP | 0728429 A1 | 8/1996 |
| GB | 2087961 A | 6/1982 |
| JP | 2005-348984 A | 12/2005 |
| JP | 3150861 U | 6/2009 |

OTHER PUBLICATIONS

U.S. Pat. No. 637,677—Shively Christian, dated Nov. 21, 1899.
Extended European Search Report for EP Application No. 17 87 5312 dated Mar. 24, 2020 (7 pages).

* cited by examiner

FURNITURE PANEL ASSEMBLY COMPRISING A WHEELHOUSE CASSETTE, AND A FURNITURE COMPRISING SUCH FURNITURE PANEL ASSEMBLY

This application is a National Stage Application of PCT/SE2017/051165, filed 24 Nov. 2017, which claims the benefit of priority to Swedish Patent Application No. 1651562-9, filed 29 Nov. 2016, which applications are incorporated herein by reference. To the extent appropriate, a claim of priority is made to each of the above disclosed applications.

TECHNICAL FIELD

The present invention refers to a furniture panel assembly comprising a wheelhouse cassette. The invention also refers to a furniture comprising such furniture panel assembly.

TECHNICAL BACKGROUND

It is well known in the art to use different types of board elements when designing furniture. Typical examples of board elements are chip board elements, particle board elements, solid wood board elements, plywood board elements, fiber board elements and board elements made from combinations of several materials. The use of board elements provides a number of advantages such as use of recycled wood or lower grade materials, the overall weight of the furniture may be reduced and also the transport volume.

The use of board elements does however require other types of connecting means and features such as wheels than those that may be used for solid wood. One underlying reason is that the failure mode differs between a board element and solid wood. As a result of the, in the most cases, inherent particulate character of a board element, a fracture in a board is often a brittle fracture, whereas a fracture in solid wood often is a ductile fracture due to the fibrous character. Further, the use of a board element often allows the designer to use a reduced material thickness which as such affects the type of connecting means that may be used and also how they are positioned. By way of example, when mounting a wheel to an edge portion of a board element, care must be taken in order of not splitting the material. This is especially the case if the wheel should be mounted with connecting means extending in parallel with the major plane of the board element and hence transverse the thickness direction.

Other aspects to consider are visual appearance and usability. When it comes to furniture there is a cosmetic consideration to be made since the furniture should be appealing to the eye. Although a furniture may be provided with a wheel, it is e.g. in many cases desired to hide the wheel. Further, when the furniture is a drawer or the like, it is in many cases a "stow away" product that should require as low height as possible. It is thereby desired that any wheels do not add to the height in any un-necessary manner. Neither should the wheel add to the width of the furniture.

As yet another requirement, a furniture which is composed of board elements is often a high volume product which requires a speedy and simple mounting and handling of all parts. There is also typically a very high degree of automatization to consider.

There is accordingly a need to provide a solution to allow mounting of wheels to a furniture which at least partly is made up of board elements.

SUMMARY

One object of the present invention is to provide a furniture panel assembly which allows an easy, speedy mounting of a wheel. The furniture panel assembly should be suitable to be handled in a high-volume and low-cost production. As another object the assembly should be durable and provide a high strength to the furniture. Further, the wheel should allow a mounting that does not in any unnecessary manner add to the width or height of the furniture.

These and other objects are solved by a furniture panel assembly comprising a furniture panel and a wheelhouse cassette, the furniture panel having first and second opposing major surfaces, and a slot extending in a plane in parallel with and at least partly between the major surfaces of the furniture panel, and wherein the wheelhouse cassette is positioned in said slot, wherein the wheelhouse cassette comprises a wheelhouse and a wheel adapted to be inserted into and retainably engage the wheelhouse, the wheel comprises two opposite protrusions together defining a rotational axis of the wheel, and the wheelhouse comprises two opposite side walls, each side wall comprising a recess adapted to retainably and rotatably receive a respective protrusion of the wheel.

The inventive furniture panel assembly comprises a wheelhouse cassette that is inserted into and received in a slot that extends in the plane of the furniture panel. A mounting is provided for that requires no cutting connecting means such as screws of the like, whereby there is no risk of splitting the furniture panel. The wheelhouse cassette may be fully integrated in the thickness direction of the furniture panel whereby it does not add to the width of the furniture panel. Also, the wheelhouse cassette may be fully integrated in the furniture panel as seen in the extension plane and will therefore not add to the height. Only a part of the wheel must project outside the perimeter of the furniture panel whereby the ground clearance may be substantially reduced. The wheelhouse, the wheel and the mounting thereof is not necessarily a visual part of the furniture panel. As yet another advantageous effect, by hiding the wheelhouse cassette inside the furniture panel, the diameter of the wheel may be increased whereby the rolling resistance against an uneven substrate such as a carpet or the like may be reduced.

The wheelhouse may easily be mounted to the furniture panel as an integral part thereof during a high-volume production. The wheelhouse may be mounted to the furniture panel, either during manufacturing of the board element from which the furniture panel is to be produced, or to a pre-fabricated furniture panel. In the latter case the furniture panel may be provided with a receiving slot by cutting a slot in the edge surface of the furniture panel, which slot extends in parallel with the major plane of the furniture panel and hence transverse the thickness direction. In case the furniture panel is of the hollow type, the wheelhouse may contribute to the rigidity and torsional rigidity of the furniture board since the wheelhouse will fill up a part of the void.

No connecting means which mechanically engage the furniture panel transverse its thickness direction are required. Further, the major part of vertical load applied to the furniture will be accommodated by the wheelhouse cassette. Thus the material making up the furniture panel as such do not have to be dimensioned to carry any higher load.

The recesses of the wheelhouse may be provided as through openings. The wheel may be arranged to the recesses by a snap-fit.

The recesses of the wheelhouse may have an insertion portion and a retaining portion. The insertion portion and retaining portion may together form a keyhole shape, where the transition between the insertion portion and the retaining portion forms a narrow passage with a width slightly smaller than the diameter of the protrusions of the wheel. Thereby the wheel may be pushed into the retaining portion by applying a pressure while at the same time being prevented from accidentally falling out. Hence a snap-fit is provided.

The wheelhouse cassette may comprise integral connecting means adapted to connect the furniture panel to another furniture panel or to another furniture part. The integral connecting means may by way of example be in the form of dowels, i.e. a male connecting means, or a groove, i.e. a female connecting means. The integral connecting means may be formed concurrently with e.g. injection molding the wheelhouse cassette.

An exterior side wall of the wheelhouse cassette may be arranged to form an exterior side wall of the furniture panel. Such exterior side wall may by way of example be the short side of a furniture panel. A thus formed short side may, depending on the design of the wheelhouse cassette be provided with integral connecting means.

The wheelhouse cassette may comprise at least one strut support. The strut support may be arranged as an abutment surface of a strut extending internally of a hollow or at least partly hollow furniture panel. The strut may act as a reinforcement of the furniture panel improving the torsion rigidity. The strut(s) may also allow attachment of connecting means to the furniture panel such as hinges or features such as knobs, handles or the like. Depending on how the furniture panel is designed, the strut may be permanently joined to the wheelhouse cassette and its strut support by e.g. adhesive, dowels or ultrasound welding. The strut may also be arranged to loosely abut the strut support.

The two opposite protrusions of the wheel may together form a nave, said nave comprising a through channel. A through channel may provide a certain degree of flexibility to the nave which will facilitate the snap-fit of the wheel to the wheelhouse. Also, by providing the nave as a through channel a reduction in weight and also a material's saving may be accounted for.

The wheelhouse may have a depth, as seen in the plane of the major surfaces of the furniture panel, enclosing at least 50% of the diameter of the wheel, and more preferred at least 65% of the diameter of the wheel. Thereby the ground clearance between the ground and the lower edge portion of the piece of furniture may be reduced. This is of special importance if the piece of furniture is a drawer or the like where any wheels should not add to the height in any un-necessary manner. Further, by hiding a major part of the wheel, a bigger wheel may be used which is advantageous since a wheel with a large diameter rolls more easily against an uneven surface, such as a carpet, than a wheel with a small diameter.

According to another aspect, the invention relates to a furniture comprising a furniture panel assembly according to any of the features given above. The furniture panel assembly as such has been described thoroughly above and to avoid undue repetition, reference is made to the above sections. As non-limiting examples, the furniture may be a drawer, a table, a sideboard table, a crate or the like.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

In the context of the invention, the term furniture panel should be understood as a panel forming part of a furniture composed of at least one panel. The furniture panel is made of a board element. The board element may, as non-limiting examples, be a chip board element, a particle board element, a solid wood board element, a plywood board element, a fiber board element or a board element made from combinations of several materials. The furniture panel may be homogenous or hollow.

Figure 1A:
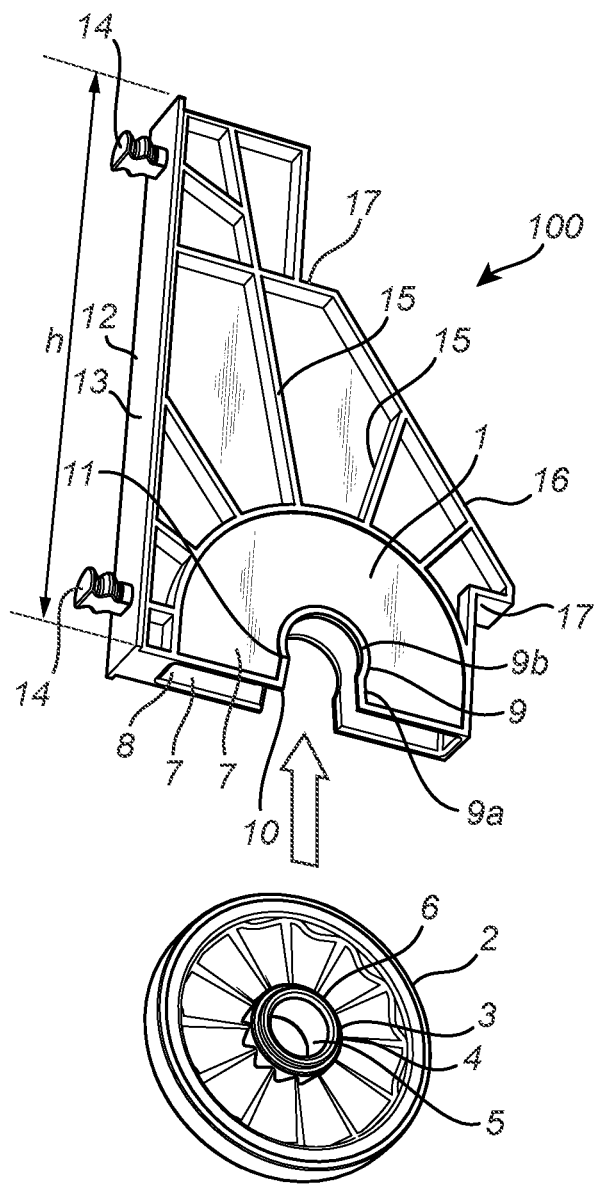
FIGS. 1A and 1B disclose one embodiment of a wheelhouse cassette and a wheel.
Figure 1B:
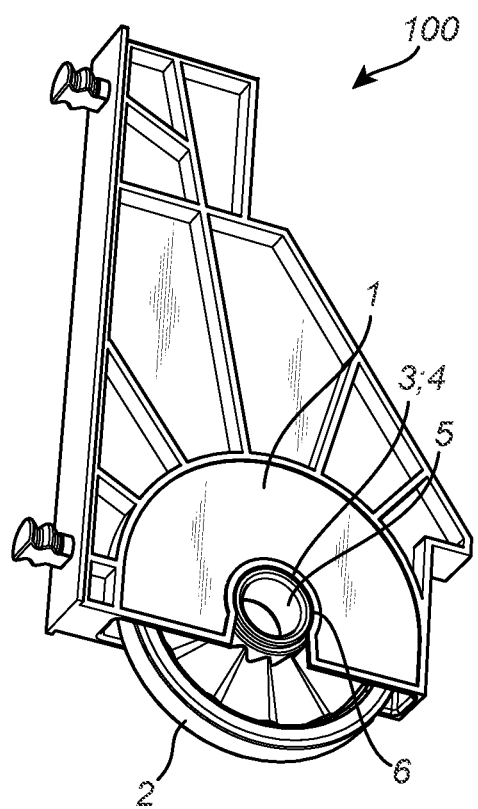

Now turning to FIGS. 1A and 1B a first embodiment of a wheelhouse cassette 100 comprising a wheelhouse 1 and a wheel 2 adapted to be inserted into and retainably engage the wheelhouse 1.

The wheel 2 comprises two opposite protrusions 3 together defining a rotational axis of the wheel 2. The two protrusions 3 do together form a nave 4. In the disclosed embodiment the nave 4 comprises a through channel 5. It is to be understood that the nave 4 with remained function may be solid. The protrusions 3 may at their free ends comprise a radially extending rim 6. The rim 6 may contribute to preventing any axial displacement of the wheel 2 in view of the wheelhouse 1. The wheel 2 together with the protrusions 3 may be formed as one unitary body by e.g. injection molding. In one example the wheel 2 may be made by TPE, whereas the nave 4 may be made by POM. It is to be understood that only one material may be used. As a non-limiting example, the diameter of the wheel may be 35-100 mm.

The wheelhouse 1 comprises two opposite and parallel side walls 7. The two side walls 7 are separated to thereby define a cavity 8 adapted to receive at least a part of the wheel 2 to be inserted between the two side walls 7. Each side wall 7 comprises a recess 9 which is formed as a through hole. The recess 9 has a keyhole shape comprising an inlet portion 9a and a receiving portion 9b. The inlet portion 9a has an open mouth 10 allowing insertion of the protrusions 3 of the wheel 2. The transition 11 between the insertion portion 9a and the retaining portion 9b forms a narrow passage with a width slightly smaller than the diameter of the protrusions 3 of the wheel 2. The retaining portion 9b has a diameter that slightly exceeds the diameter of the protrusions 3 of the wheel 2.

When mounting the wheel 2 to the wheelhouse 1 the protrusions 3 of the wheel 2 are inserted into the insertion portion 9a and then the wheel 2 is pushed into the retaining portion 9b. Hence, the wheel 2 is mounted by a snap-fit. Once mounted, the wheel 2 is rotatably retained in the retaining portion 9b.

By making the protrusions 3 of the wheel 2 hollow, the walls of the protrusions 3 may slightly flex, thereby facilitating the mounting of the wheel 2 to the wheelhouse 1. It is to be understood that the degree of flexing is determined by parameters such as material properties and material thickness. As an alternative to providing the protrusions 3 with a through channel 5, the same effect may be provided by providing each protrusion 3 with an axially extending blind hole (not disclosed).

The disclosed embodiment of the wheelhouse cassette 100 further comprises a first edge portion 12. The first edge portion 12 has an essentially flat base surface 13. The first edge portion 12 has a height h corresponding to the intended height H of the furniture panel and may form an edge of the furniture panel. This is best seen in FIG. 2B.

Two connecting means 14 the form of dowels, i.e. male connecting means, are projecting from the base surface 13 of the first edge portion 12. It is to be understood that other types of connecting means 14 may be used and also that the connecting means 14 may be omitted. As an alternative to male connecting means, female connecting means may be used. Also a combination between male and female connecting means may be used. The invention should not be restricted to the presence or the type of connecting means 14.

The wheelhouse cassette 100 is disclosed as a thin walled unitary body with reinforcing ribs 15 forming a framework structure. The wheelhouse cassette 100 may be formed as a unitary body by way of example injection molding a plastics material. As a non-limiting example, the wheelhouse cassette 100 may be formed by Nylon, such as PA6 or ABS.

The disclosed wheelhouse cassette 100 comprises along a second edge portion 16 two optional strut supports 17. Each strut support 17 is arranged to form an abutment surface for a strut to be described below. The design and extensions of the strut supports 17 depends on the type and extension of the struts. Also, the number of strut supports 17 may differ. The strut supports 17 may be provided with non-discloses connecting means to engage the struts. As non-limiting examples such connecting means may be dowels or a socket.

Figure 2A:
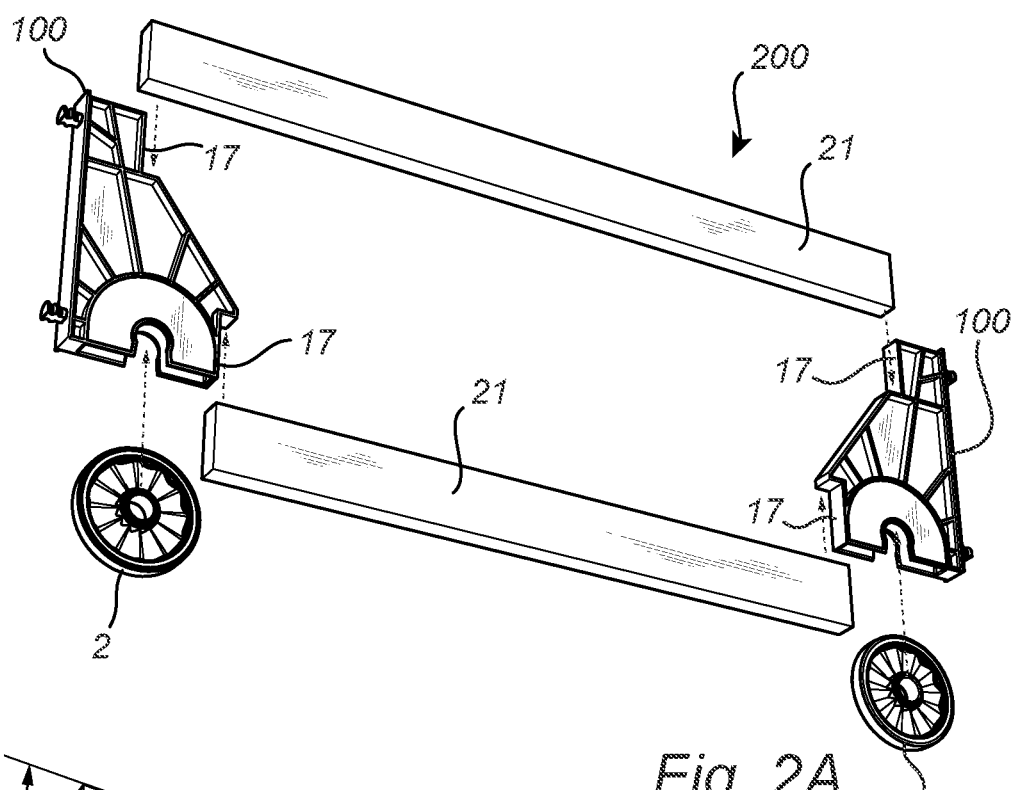
FIGS. 2A-2C disclose a furniture panel assembly comprising a wheelhouse cassette, a wheel, struts and a furniture panel.
Figure 2B:
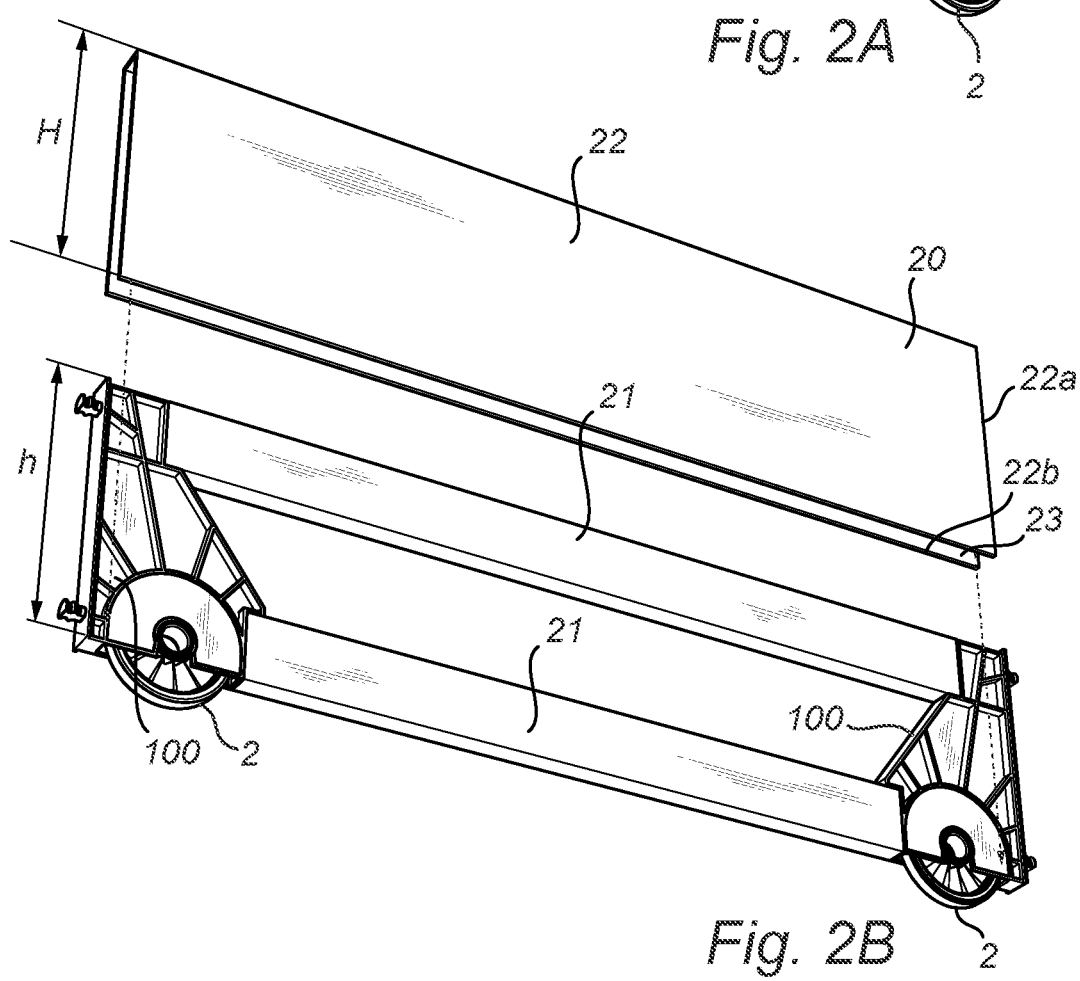

Now turning to FIGS. 2A and 2B, one embodiment of a furniture panel assembly 200 is disclosed. The furniture panel assembly 200 comprises two wheelhouse cassettes 100 of the type disclosed in FIGS. 1A and 1B and a furniture panel 20 of the hollow type comprising two struts 21 and a cover 22.

Starting with FIG. 2A, the two wheelhouse cassettes 100 are interconnected by the two struts 21. The struts 21 may be made of e.g. any plastics material, wood, metal or a composite material. The struts 21 are disclosed as having a rectangular cross section. The struts 21 may have a hollow or a solid cross section. The two struts 21 are arranged to abut the respective strut supports 17 and extend in parallel to each other in the extension plane of the furniture panel 300 to be formed. The struts 21 and wheelhouse cassettes 100 may be held in position by any non-disclosed fixture. Also, any suitable connecting means such as adhesive, dowels or the like may be used. The void formed between the struts 21 and the wheelhouse cassettes 100 may be filled with any optional filling (not disclosed).

The wheelhouse cassettes 100 may be provided with pre-mounted wheels 2 or the wheels 2 may be mounted while arranging the struts 21.

Now turning to FIG. 2B, a surface material in the form of an encapsulating cover 22 is mounted. In the disclosed embodiment the cover 22 is disclosed as a U-shaped, thin-walled cover that is fitted onto the wheelhouse cassettes 100 and the struts 21. The cover 22 may be mounted and fixed to the wheelhouse cassette 100 and the struts 21 by using e.g. adhesive or ultrasound welding. In this embodiment, the opposing walls 22a, 22b of the cover 22 delimits a slot 23 in which the wheelhouse cassette 100 is received. Thereby a furniture panel 300 with two integrated wheelhouse cassettes 100 with wheels 2 are provided. As is best seen in FIG. 2C the major part of the wheels 2 will be hidden inside the furniture panel 300.

As an alternative to providing the thin-walled cover 22 as a U-shaped cover, the cover may be provided as flat sheet which during concurrent application of heat and pressure is folded around the assembly provided by the wheelhouse cassettes 100 and the struts 21 and thereby encapsulate the assembly 200.

The steps disclosed in FIGS. 2A and 2B are all of such character that they are suitable for a high volume production.

Figure 2C:
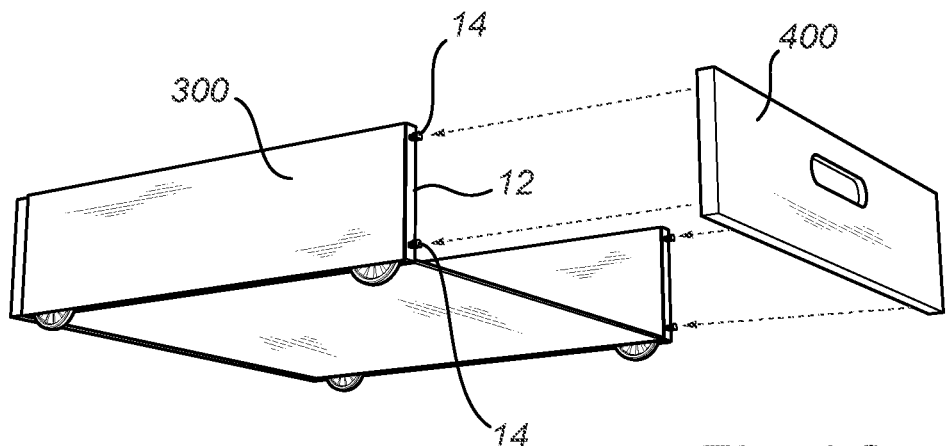

Now turning to FIG. 2C, as a result of the first edge portion 12 of the wheelhouse cassette 100 being provided with integral connecting means 14, the resulting furniture panel 300 may be mounted to one or several complementary furniture panels or furniture parts, such as a panel making up a front panel and a rear panel of a furniture exemplified as a drawer.

Figure 3A:
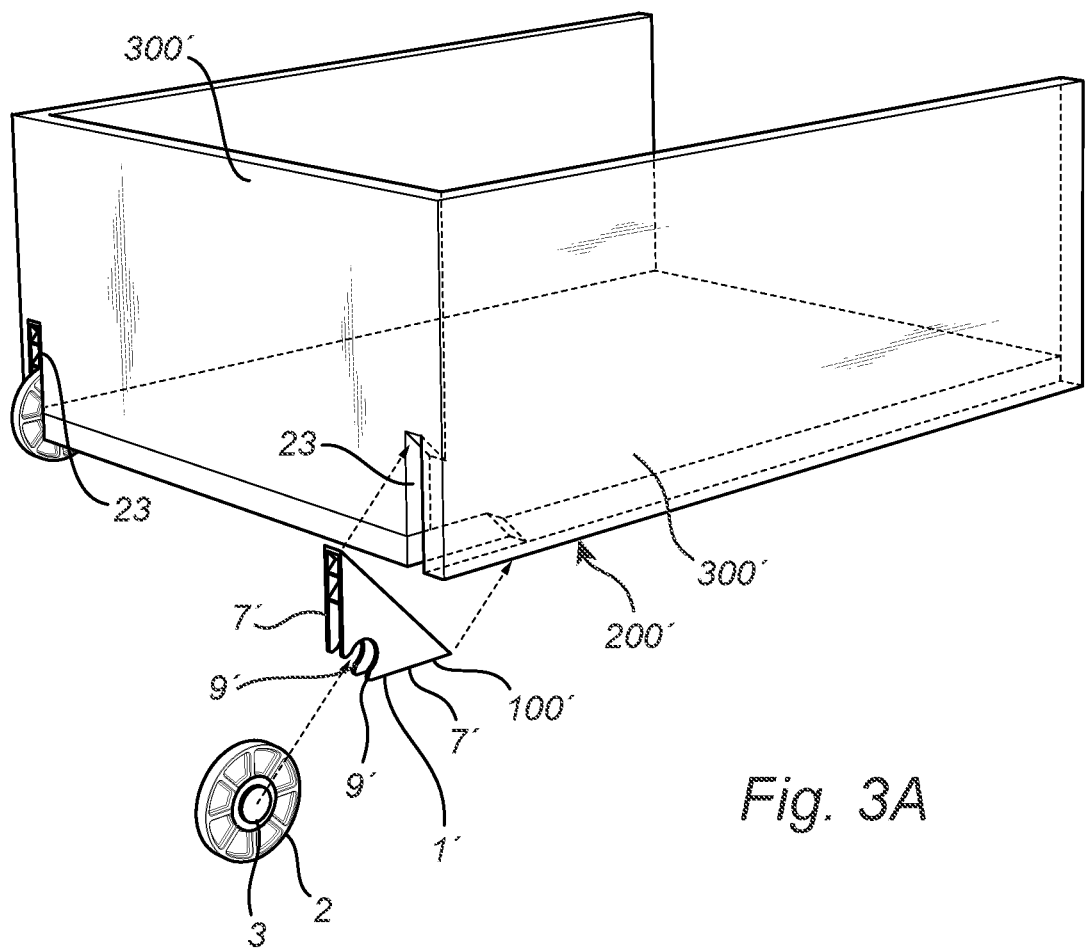
FIGS. 3A-3C disclose another embodiment of a wheelhouse cassette and its use.
Figure 3B:
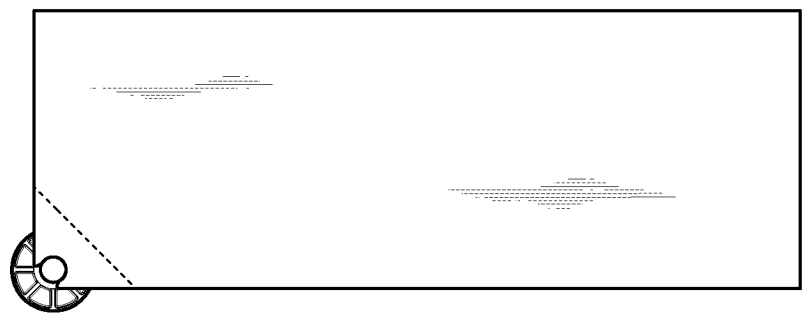
Figure 3C:
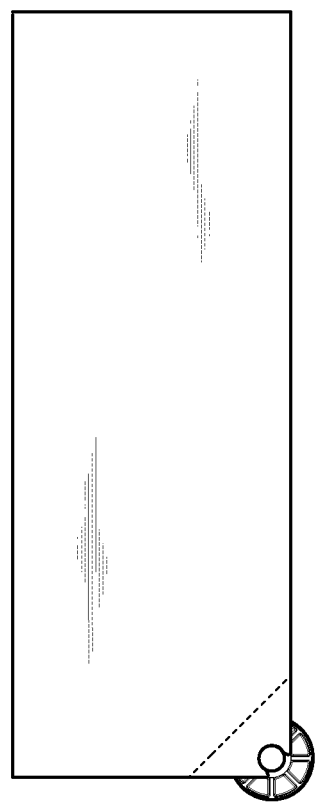

Now turning to FIG. 3A-3C, a second embodiment of the wheelhouse cassette 100' is disclosed.

The wheelhouse cassette 100' has an essentially right-angled triangular design. The wheelhouse cassette 100' has a wheelhouse 1' comprising two opposite triangular side walls 7'. Each side wall 7' comprises a keyhole shaped through recess 9'. The recess 9' is arranged in the corner of the two legs of the triangular wheelhouse cassette 100'. The recesses 9' are adapted to retainably and rotatably receive the protrusions 3 of the wheel 2.

The wheelhouse cassette 100' may be mounted to the furniture panel 300' by using e.g. adhesive, dowels or the like. In the disclosed embodiment the wheelhouse cassette 100' is received in a slot 23 arranged in the interspace between adjacent furniture panels 300'. The free edges of the wheelhouse cassette 100' may be covered by any surface material (not disclosed) or be a part of the exterior furniture design.

FIGS. 3B and 3C disclose, highly schematically two different orientations of a resulting furniture panel assembly.

Figure 4:
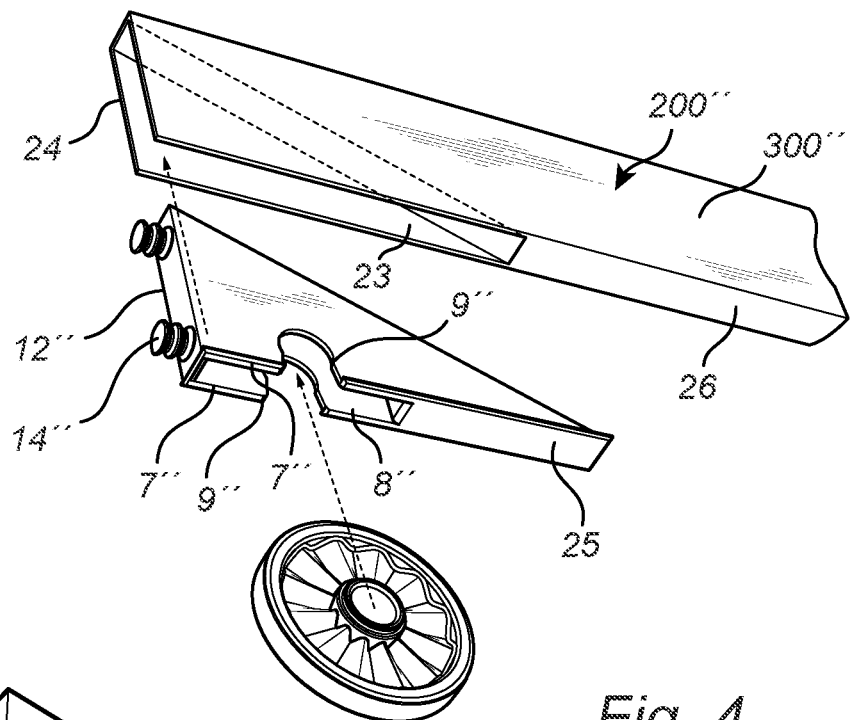
FIG. 4 discloses an embodiment of a wheelhouse cassette mounted to a furniture panel.

FIG. 4 discloses a third embodiment of a furniture panel assembly 200" according to the invention. The wheelhouse cassette 100" has an essentially triangular shape. The wheelhouse 1" of the wheelhouse cassette 100" is defined between two essentially flat side walls 7" defining a cavity 8". Each side wall 7" comprises a key-hole shaped recess 9" adapted to receive the protrusions 3 of the wheel 2. A first edge portion 12" of the wheelhouse cassette 100" comprises an essentially flat edge portion with two projecting male connecting means 14". It is to be understood that other types of connecting means 14" may be used, such as female connecting means. Also, the connecting means 14" may be omitted.

The triangular wheelhouse cassette 100" is adapted to be inserted into a slot 23 arranged in the corner of a furniture panel 300". When inserted into the slot 23, the first edge portion 12" lies in flush with a corresponding first edge 24 of the furniture panel, while the edge 25 of the wheelhouse cassette 100" provided with the wheel 2 lies in flush with a second edge 26 of the furniture panel 200".

The wheelhouse cassette 100" may be permanently joined to the furniture panel 300" by using e.g. adhesive or ultrasound welding.

Figure 5:
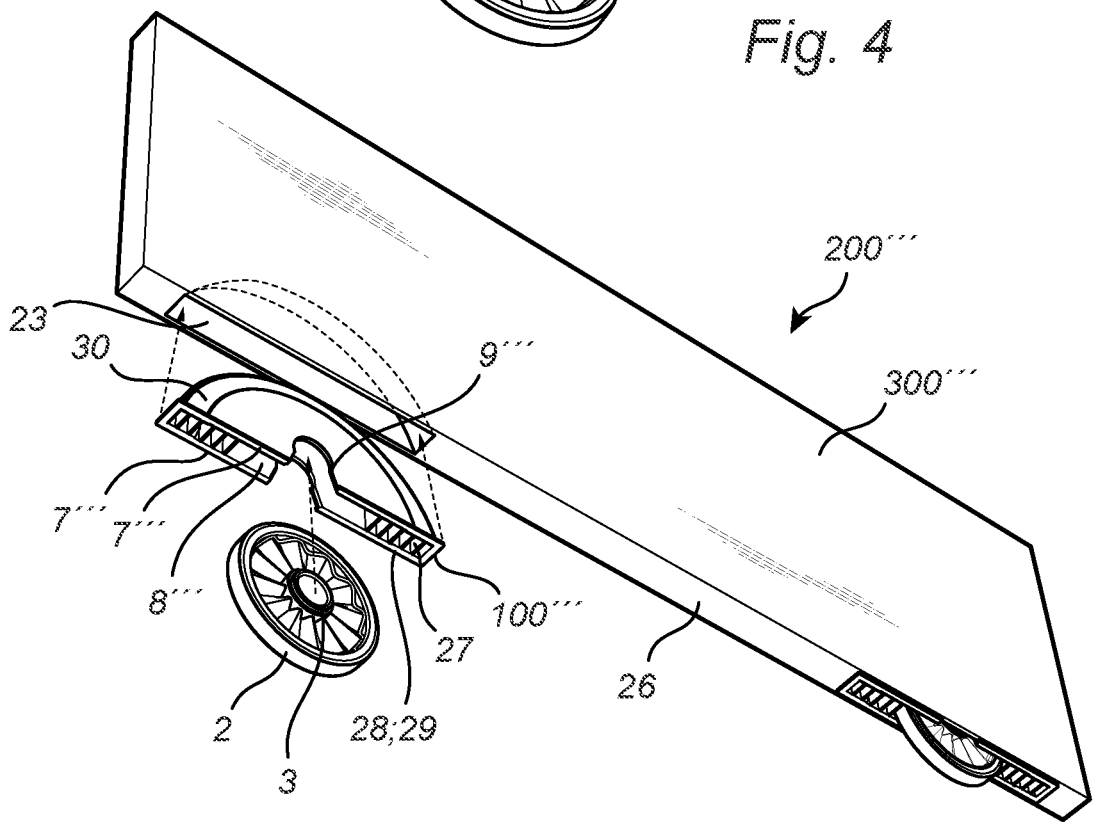
FIG. 5 discloses an embodiment of a wheelhouse cassette mounted to a furniture panel.

Now turning to FIG. 5, a fourth embodiment of a furniture panel assembly 200''' according to the invention is disclosed. The wheelhouse cassette 100''' has an essentially half-circular shape. The wheelhouse 1''' of the wheelhouse cassette 100''' is defined between two essentially flat side walls 7''' defining a cavity 8'''. To improve the rigidity of the wheelhouse cassette 100''' the side walls 7''' may be interconnected by a framework of ribs 27 extending between the side walls 7'''. The free edge 28 surrounding the mouth of the wheelhouse 1''' is provided by an optional outwardly extending flange 29.

Each side wall 7''' comprises a key-hole shaped through recess 9''' adapted to receive the protrusions 3 of the wheel 2.

The half-circular wheelhouse cassette 100''' is adapted to be inserted into a cut-out 23 arranged along an edge of a furniture panel 300'''. When inserted into the cut-out 23, the outwardly extending flange 29 of the wheelhouse 1''' will lie in flush with the edge 26 of the furniture panel 300'''. The wheelhouse cassette 100''' may be permanently joined to the furniture panel 300''' by using e.g. adhesive or ultrasound welding. The essentially flat side walls 7''' of the wheelhouse cassette 100''' may comprise a depression 30 adapted to form a pocket or trap for adhesive to be applied before mounting the wheelhouse cassette 100''' to the furniture panel 300'''.

In the embodiments given above the recesses of the wheelhouse adapted to receive the protrusions of the wheel have been described as keyhole shaped through holes. It is to be understood that the recesses must not be formed as through openings, but instead may be formed as rims or depressions arranged in the opposing side walls defining the wheelhouse.

By way of example, the recesses may be formed by circumferential, circular projecting rims arranged in the opposing side walls of the wheelhouse. The circumferential rims may have an extension perpendicular to the extension of the side walls. The rims may have a height as seen in the axial direction of the rotational axis of the wheel that allows a snap-in mounting of the wheel. When mounting the wheel to the wheelhouse the protrusions of the wheel are pressed against the rims, whereby the sidewalls of the wheelhouse will flex and thereby allow a snap-fit engagement. It is to be understood that the same effect as is received with the projecting rims may be achieved by replacing the rims with corresponding depressions.

As an alternative to using circular rims or depressions having an extension perpendicular to the extensions of the side walls, the rims or depressions may be keyhole shaped having an insertion portion and a retaining portion. When mounting a wheel (not shown) the protrusions of the wheel are inserted into the insertion portion and then pushed into the retaining portion. Thereby a snap-fit engagement between the wheelhouse and the protrusions of the wheel is provided for.

No matter embodiment, the wheelhouse may be provided with a depth, as seen in the plane of the major surfaces of the furniture panel, enclosing at least 50% of the diameter of the wheel, and more preferred at least 65% of the diameter of the wheel.

Instead of providing the wheelhouse receiving slot as a cut-out in a furniture panel it is to be understood that a wall of a wheelhouse receiving slot may be formed by a surface material of the furniture panel.

The invention claimed is:

1. Furniture panel assembly comprising a furniture panel and a wheelhouse cassette, the furniture panel having first and second opposing major surfaces, and a slot extending in a plane in parallel with and at least partly between the major surfaces of the furniture panel, and wherein the wheelhouse cassette is positioned in said slot, wherein the wheelhouse cassette comprises a wheelhouse and a wheel adapted to be inserted into and retainably engage the wheelhouse, the wheel comprises two opposite protrusions together defining a rotational axis of the wheel, the wheelhouse comprises two opposite side walls, each side wall comprising a recess adapted to retainably and rotatably receive one of the two opposite protrusions of the wheel, and the recesses of the wheelhouse have an insertion portion and a retaining portion, and the recesses each comprise a keyhole arrangement having a transition between the insertion portion and the retaining portion that forms a passage with a width slightly smaller than the diameter of the two opposite protrusions of the wheel to provide a snap-fit.

2. Furniture panel assembly according to claim 1, wherein the recesses of the wheelhouse are provided as through openings.

3. Furniture panel assembly according to claim 1, wherein the recesses of the wheelhouse are provided as depressions or rims and wherein the depressions or rims are arranged to face each other in the two opposite side walls of the wheel house.

4. Furniture panel assembly according to claim 1, wherein the wheelhouse cassette comprises integral connecting means adapted to connect the furniture panel to another furniture panel or to another furniture part.

5. Furniture panel assembly according to claim 1, wherein an edge portion of the wheelhouse cassette is arranged to form an edge of the furniture panel.

6. Furniture panel assembly according to claim 1, wherein the wheelhouse cassette comprises at least one strut support.

7. Furniture panel assembly according to claim 1, wherein the two opposite protrusions of the wheel together form a nave, said nave comprising a through channel.

8. Furniture panel assembly according to claim 1, wherein the wheelhouse has a depth, as seen in the plane of the major surfaces of the furniture panel, enclosing at least 50% of the diameter of the wheel.

9. Furniture panel assembly according to claim 1, wherein the wheelhouse has a depth, as seen from the plane of the major surfaces of the furniture panel, enclosing at least 65% of the diameter of the wheel.

10. Furniture comprising a furniture panel assembly, wherein the furniture panel assembly comprises a furniture panel and a wheelhouse cassette, the furniture panel having first and second opposing major surfaces, and a slot extending in a plane in parallel with and at least partly between the major surfaces of the furniture panel, and wherein the wheelhouse cassette is positioned in said slot, wherein the wheelhouse cassette comprises a wheelhouse and a wheel adapted to be inserted into and retainably engage the wheelhouse, the wheel comprises two opposite protrusions together defining a rotational axis of the wheel, the wheelhouse comprises two opposite side walls, each side wall comprising a recess adapted to retainably and rotatably receive one of the two opposite protrusions of the wheel, and the recesses of the wheelhouse have an insertion portion and a retaining portion, the recesses each comprise a keyhole arrangement having a transition between the insertion portion and the retaining portion that forms a passage with a width slightly smaller than the diameter of the two opposite protrusions of the wheel to provide a snap-fit.

11. Furniture panel assembly comprising a furniture panel and a wheelhouse cassette, the furniture panel having first and second opposing major surfaces, and a slot extending in a plane in parallel with and at least partly between the major surfaces of the furniture panel, and wherein the wheelhouse cassette is positioned in said slot, wherein
- the wheelhouse cassette has an essentially half-circular shape and comprises a wheelhouse and a wheel adapted to be inserted into and retainably engage the wheelhouse,
- the wheel comprises two opposite protrusions together defining a rotational axis of the wheel, and
- the wheelhouse comprises two opposite side walls defining a cavity there between, each side wall comprising a recess adapted to retainably and rotatably receive a respective protrusion of the wheel.

12. The furniture panel assembly according to claim 11, wherein the side walls are interconnected by a framework of ribs extending between the side walls.

13. The furniture panel assembly according to claim 11, wherein each recess is a key-hole shaped through recess.

14. The furniture panel assembly according to claim 11, wherein a free edge of the wheelhouse is provided with an outwardly extending flange, whereby, when the wheelhouse cassette is inserted into the slot, the outwardly extending flange lies flush with an edge of the furniture panel.

* * * * *